F. G. D. HOLMES.
Improvement in Weighing-Scales.
No. 128,397. Patented June 25, 1872.
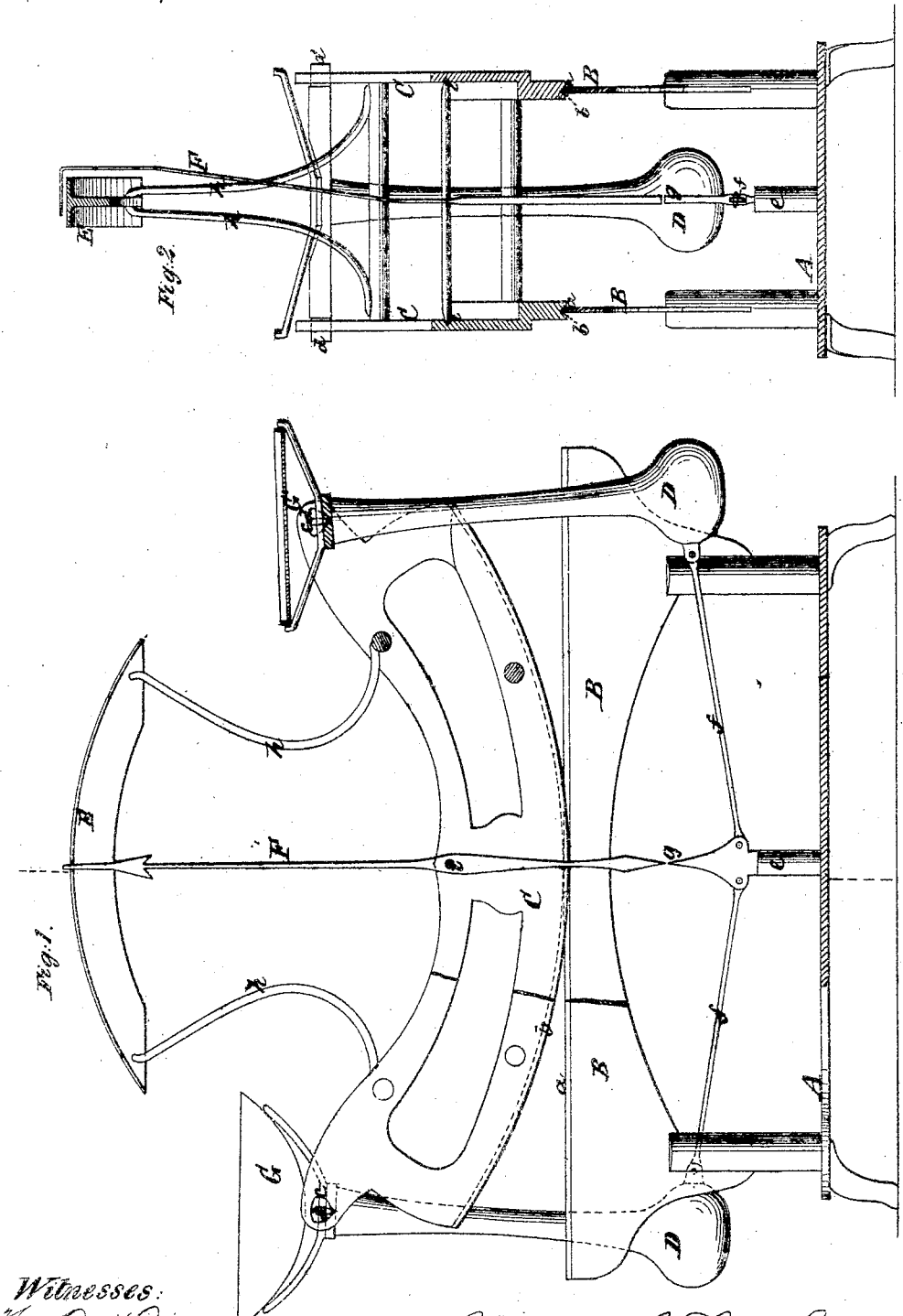
Witnesses:
Fred. Haynes
J W Coombs
Francis G. D. Holmes
per B W Coombs
Attorney.

UNITED STATES PATENT OFFICE.

FRANCIS G. D. HOLMES, OF PHILLIPSBURG, NEW JERSEY.

IMPROVEMENT IN WEIGHING-SCALES.

Specification forming part of Letters Patent No. 128,397, dated June 25, 1872.

*To all whom it may concern:*

Be it known that I, FRANCIS G. D. HOLMES, of Phillipsburg, in the county of Warren and State of New Jersey, have invented a new and useful Improvement in Weighing-Scales, of which the following is a full, clear, and exact description, reference being had to the accompanying drawing forming part of this specification, in which—

Figure 1 is a side elevation, partly in section, of scales constructed according to my invention; and Fig. 2 is a transverse section of the same taken on the line $x\ x$.

Similar letters of reference indicate corresponding parts in both figures.

The object of my invention is to dispense with the use of movable weights or springs in weighing-scales; and to this end it consists in a scale composed of the following elements, viz., a beam having an inverted arc-formed bottom, and supported on rectilinear ways, on which it is capable of rocking; pendulous weights permanently suspended from said beam, their lower parts connected by radius rods, with a stationary central post; a gravitating index suspended from said beam; and a graduated index-plate rigidly attached to said beam; the whole combined to operate substantially as hereinafter described.

To enable others to fully understand the construction of my invention, I will proceed to describe the same with reference to the drawing.

A is a base or bed-plate of any desirable construction. B B are rectilinear ways formed upon or rigidly secured to said base, and arranged horizontally and parallel with each other. The upper surfaces $a\ a$ of said ways are formed with V-shaped edges. C is a beam, the lower edges $b\ b$ of which are of inverted-arc form, and grooved to fit over the edges $a\ a$ of the ways B B, thereby enabling the beam C to rock on the ways B B without dropping off sidewise, and causing but little friction. At both ends of the beam C proper bearings $c\ c$ are formed, from which weights D D are permanently suspended on knife-edged pivots $d\ d$. The lower ends of said weights are connected with a fixed central post, $e$, secured to the base A, by means of radius rods $f\ f$. The upper portion of the post $e$ is formed into a sharp edge or point, $g$. E is an index-plate of arc-form, which is centrally arranged a convenient distance above the beam C, and rigidly secured thereto by means of supports $h\ h$. The index is marked thereon alike, commencing from the center toward the ends of the plate. F is the gravitating index, which hangs vertically on centers $i\ i$ in the sides of the beam C, so that if the beam is in its normal state the upper end of said tongue will be exactly in the center of the index-plate, while the lower end will be in line with the edge or point $g$. The weighing-pans or dishes G G' are placed on top of the fixed weights D D, where proper supports are provided for them. One of the dishes may be flat, and the other be deep, as the different articles to be weighed will require. Thus, placing the article to be weighed on either of the dishes, the beam will be accordingly depressed on that side, and carrying the index-plate with it, enables the gravitating index F to indicate the weight of the article.

By this construction and arrangement of weighing-scales movable weights and springs are entirely dispensed with, and the process of weighing becomes more simple and reliable than with ordinary scales, besides enabling the weighing of different articles without being obliged to take off the dishes.

What is here claimed, and desired to be secured by Letters Patent, is—

The arrangement of the weights D D, permanently suspended at each end of the rocking lever C, and connected by links $f$ with the stationary center-post $e$, in combination with the gravitating index F and index-plate E, all as shown and described.

FRANCIS G. D. HOLMES.

Witnesses:
JOHN INGHAM,
ALEXANDER MOORE.